United States Patent [19]

Howard

[11] 4,070,060

[45] Jan. 24, 1978

[54] DUMP TRUCK

[75] Inventor: William E. Howard, West Hartford, Conn.

[73] Assignee: Materials Handling Systems, Inc., West Hartford, Conn.

[21] Appl. No.: 727,706

[22] Filed: Sept. 29, 1976

[51] Int. Cl.² .............................................. B62B 3/08
[52] U.S. Cl. ...................................... 298/2; 16/35 R; 214/318; 280/79.2
[58] Field of Search .............. 298/2, 1 R; 280/79.1 R, 280/79.2, 79.3, 47.21; 16/35 R; 214/318, 220, 222, 206

[56] References Cited

U.S. PATENT DOCUMENTS

| 2,102,684 | 12/1937 | Dorward | 280/2 |
|---|---|---|---|
| 2,103,866 | 12/1937 | Norris | 280/47.21 |
| 2,154,525 | 4/1939 | Noros | 280/79.2 X |

FOREIGN PATENT DOCUMENTS

| 725,774 | 9/1942 | Germany | 280/47.21 |
|---|---|---|---|
| 281,380 | 3/1944 | Switzerland | 280/47.21 |

*Primary Examiner*—Robert J. Spar
*Assistant Examiner*—George F. Abraham
*Attorney, Agent, or Firm*—Prutzman, Hayes, Kalb & Chilton

[57] ABSTRACT

A manually operated dump truck is provided with front wheels which are located and mounted on the bottom of the truck, as for example, on swivels, so that they are selectively movable from a forward position substantially in advance of the center of gravity of the truck, which is the position selected when the truck is being loaded or used as a conveyance, to a position more closely adjacent the center of gravity when the truck is to be dumped thus reducing the amount of energy required to tip the truck forwardly in a dumping action. Manually controlled latching means is provided to maintain the wheels in the forward position.

2 Claims, 7 Drawing Figures

DUMP TRUCK

The present invention relates to dump trucks of the type which are manually operated and commonly used in such places as shops and plants for conveying and dumping bulk materials such as scrap, machine chips, waste material and the like. The invention pertains more particularly to an improved structure for such dump trucks which facilitates the dumping of the truck when it is desired to empty the contents therefrom.

A principal aim of the invention is to provide a dump truck which can be dumped with a minimum of effort but without sacrifice of stability and safety of operation. Included in this aim is the provision of a dump truck structure which can be easily operated by a person of moderate strength or, conversely, which permits the manufacture of larger and heavier dump trucks than heretofore thought possible for operation by a single person.

A further aim of the invention is to provide an improved dump truck of the type referred to which can be produced without material increase in cost over that of conventional dump trucks not having these improved features and which may be constructed with readily available commercially produced components, thus minimizing tooling and production expenses.

Another aim of the invention is to provide a dump truck structure of the type referred to which is rugged in design so as to have a long service life without need for repair or replacement, and which is simple and foolproof in operation so that it can be utilized by persons of minimum skills and with a minimum of instruction.

Other objects will be in part obvious and in part pointed out more in detail hereinafter.

A better understanding of the invention will be obtained from the following detailed description and the accompanying drawings of an illustrative embodiment of the invention.

DESCRIPTION OF A PREFERRED EMBODIMENT

Figure 1:
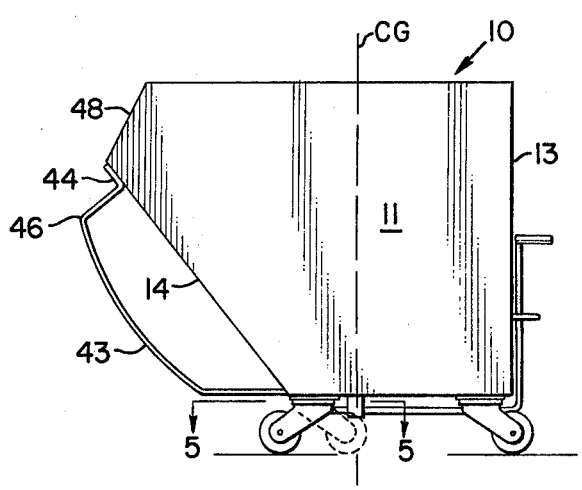
FIG. 1 is a side view of an exemplary dump truck embodying the invention.
Figure 2:
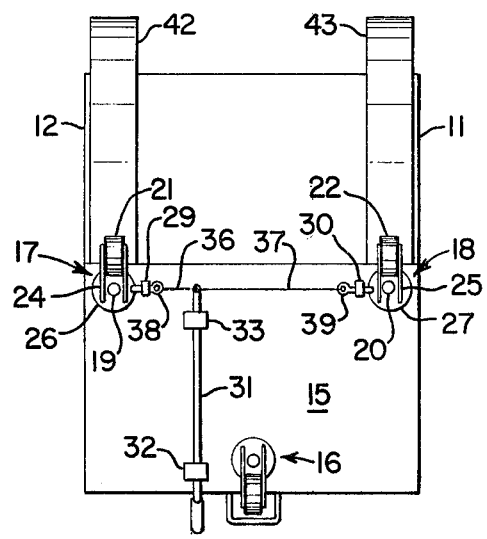
FIG. 2 is a bottom view thereof.
Figure 3:
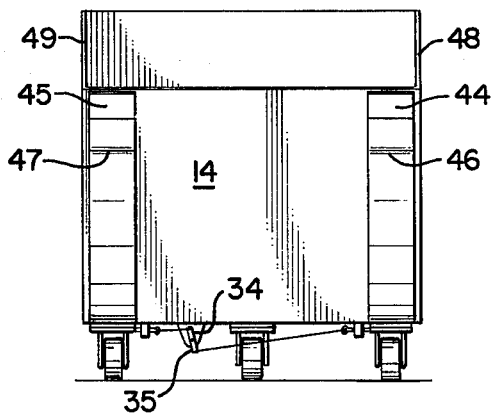
FIG. 3 is a front elevational view thereof.

Referring to the drawings in detail, a preferred embodiment of the invention is shown as applied to an exemplary dump truck 10 comprising pentagonal side walls 11 and 12, a rectangular rear wall 13, an upwardly and forwardly extending front wall 14, and a rectangular bottom or floor 15. As will be appreciated, although the dump truck 10 is shown as a preferred embodiment, the invention is equally applicable to dump trucks of differing shapes and sizes. The walls 11–14 and floor 15 are made of any suitable material, preferably sheet steel or reinforced plastic or fiberglass.

In the preferred embodiment, the rear of the truck is supported on a single caster 16 located centrally near the rear wall 13. The way the rear of the truck is supported is not critical and, if desired, additional supporting means could be employed such as by providing a pair of casters located, respectively, at the rear corners of the truck.

In accordance with the invention, the front portion of the truck is supported on casters 17 and 18 having their swivels 19 and 20, respectively, so positioned and located that when the wheels 21 and 22 of the casters are swiveled to the forward positions shown in solid lines in FIG. 1, the wheels 21 and 22 are well in advance of the center of gravity of the truck and when they are swiveled to the rearward position as shown in dotted lines in FIG. 1, the wheels are at or very near to the center of gravity of the truck. The approximate location of the center of gravity of the truck is indicated by the broken line labeled CG in FIG. 1.

It has been found that when the wheels 21, 22 are in the forward solid line position, the truck is relatively stable and safe to load and move about without danger of tipping. However, when the wheels 21, 22 are swiveled to the rearward dotted line position adjacent the center of gravity, the truck can be easily tipped forward with a minimum effort even by persons of modest physical strength. The handle 23 fastened to the rear wall 13 is intended to be grasped by the operator when applying a lifting force to the rear of the truck to tip the truck forward and dump or empty the truck of its contents. As will be appreciated, the longer the radial length of the forks 24 and 25 of the casters 17 and 18, the greater will be the distance that the wheels 21, 22 can be advanced and retracted, the advanced position being the normal operating position and the retracted position being the dumping position. The more advanced the wheels are in the forward position, the more stable the truck will become which is particularly important as the size and capacity of the truck is increased.

Figure 4:
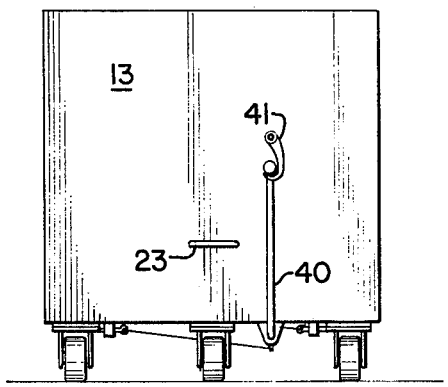
FIG. 4 is a rear elevational view thereof.
Figure 5:
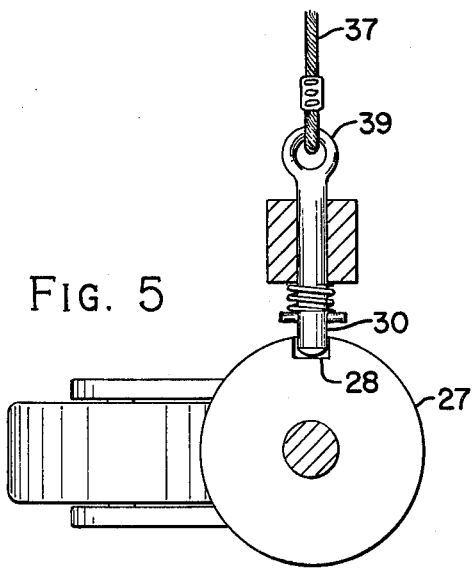
FIG. 5 is a fragmentary cross-sectional view taken along the line 5—5 of FIG. 1.

In order to retain the wheels 21, 22 in the forward position which is the normal operating position when the truck is being loaded or moved about, the swivel plates or discs 26 and 27 which are part of the casters 17 and 18 and which turn or rotate as the wheels are swiveled about, are each provided with a notch 28 as best shown in FIG. 5 of the drawings. Mounted on the underside of the floor 15 are spring pressed latches 29 and 30 which are located to automatically engage in the notches 28 and prevent the casters 17 and 18 from turning when the wheels 21, 22 are in the forward position. To latch the wheels 21, 22 in advanced position if they are not already there, all that it is necessary to do is to pull the truck backwards a small amount, preferably with a slight rotary movement of the front end of the truck whereupon the casters 17 and 18 will be caused to swivel to bring the wheels 21, 22 to the forward position and will be automatically latched in such position by the latches 29 and 30. In order to disengage the latches 29 and 30 to permit the casters 17 and 18 to swivel to bring the wheels 21, 22 to the retracted position, shaft 31 extending longitudinally of the truck and journaled on the underside of the floor 15 at 32 and 33 has at its forward end, two pins or crank arms 34 and 35 which are respectively attached such as by cables 36 and 37 to the pull rings 38 and 39 of the latches 29, 30 by means of which the latches may be disengaged from the notches 28. As will be apparent, when the shaft 31 is turned in a counter-clockwise direction as viewed in FIG. 4, the pins 34, 35 will apply tension to the cables 36, and 37, thus retracting the latches 29 and 30 and freeing the casters 17 and 18 for swiveling movement to bring the wheels 21, 22 to the retracted position. Once the latches 29, 30 are released, it is easy to cause the casters 17 and 18 to swivel to retract the wheels merely by pushing the truck forward a small amount, again preferably with a slight rotary movement of the front end of the truck. There is no need to latch the casters 17 and 18 with the wheels 21, 22 in the retracted position as the forces applied when dumping the truck is more than sufficient to keep the wheels in the retracted position while the truck is being dumped. In the embodiment shown in the drawing, the shaft 31 is operated by handle or lever 40 fixed to the rear end of shaft 31 and extending upwardly at the back of the truck for actuation by the operator and a manually releasable catch 41 is provided on the wall 13 to hold the operating lever 40 in latch-releasing position, i.e. when the lever 40 and shaft 31 have been actuated to move the latches 29, 30 to released position. If preferred, a foot pedal may be substituted for the hand lever 40 so that the latches 29, 30 can be released by the operator merely by pressing down on the lever with his foot which can be done conveniently at the same time that the truck is being pushed forward to turn the casters 17 and 18 to the rearward position.

Figure 6:
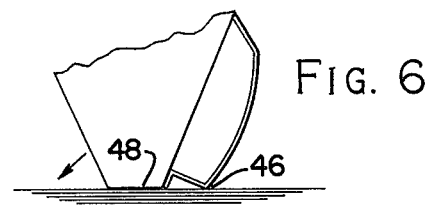
FIG. 6 is a fragmentary side view of the dump truck showing the dump truck in dumping position on a flat surface.
Figure 7:
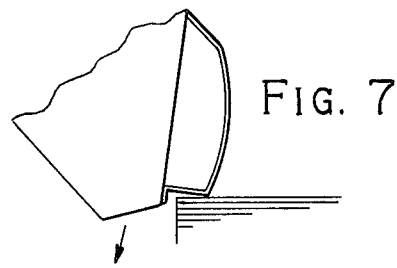
FIG. 7 is a view similar to FIG. 6 showing the dumping position at the edge of a platform or bulkhead.

To facilitate the dumping action of the truck, a pair of rockers 42, 43 are fixed to the front wall 14. The curvature of the rockers 42, 43 is preferably at substantially a constant radius from the approximate center of gravity of the truck and at approximately the same distance or radius as the distance from the approximate center of gravity of the truck to the lower periphery of the wheels 21 and 22 when the wheels are in retracted position. Thus, when the truck is tilted forward in a dumping operation, the weight of the truck is smoothly transferred from the wheels 21, 22 to the rockers 42, 43 and the dumping can be completed in a continuous uninterrupted rocking or rolling movement. The connection of the upper end of the rockers 42, 43 to the top of the wall 14 is by means of right-angled portions 44, 45 which dispose the corners 46, 47 in alignment with but spaced from the forwardly and downwardly extending edges 48, 49 of the side walls 11 and 12, respectively. As a result of this construction, the truck during a dumping operation can be tilted forwardly until it comes to rest on the corners 46, 47 of the rockers and the front edges 48, 49 of the walls 11 and 12, as shown in FIG. 6, which is a balanced stabilized position and a position which insures complete emptying of the contents of the truck. The angled portions 44, 45 also provide a clearance or notch which is useful when it is desired to dump the contents of the truck over the edge of a platform or bulkhead as shon in FIG. 7.

As will be apparent to persons skilled in the art, various modifications, adaptations and variations of the foregoing specific disclosure can be made without departing from the teachings of the present invention.

I claim:

1. A manually operable dump truck comprising a truck body having a longitudinally extending bottom member intersecting at its front end with an upwardly and forwardly extending front wall, the center of gravity of the truck body being rearwardly of the intersection of the front wall and bottom member, rear supporting means for the truck including wheel means mounted on the bottom member rearwardly of the center of gravity, forward supporting means for the truck comprising a pair of laterally spaced apart casters mounted on the bottom member between the intersection of the front wall and bottom member and the center of gravity, said casters having wheels offset from the axes of the casters and being adopted to swivel in response to movement of the dump truck in a rearward direction to bring the wheels forwardly to a stabilizing position away from the center of gravity and in response to movement of the dump truck in a forward direction to bring the wheels rearwardly to a dumping position nearer the center of gravity, and manually controllable means for latching both casters in the forward stabilizing position.

2. A manually operable dump truck as defined in claim 1 wherein a pair of spaced apart rockers are mounted on the front wall to support the forward end of the truck during a dumping operation and wherein the truck body has side walls provided with front edges extending upwardly and rearwardly from the upper edge of the front wall for supporting the truck in fully dumped position.

* * * * *